United States Patent [19]

Yamamori et al.

[11] Patent Number: 4,820,748

[45] Date of Patent: Apr. 11, 1989

[54] ANTIFOULING COATING COMPOSITION

[75] Inventors: Naoki Yamamori; Kazunori Kanda, both of Osaka, Japan

[73] Assignee: Nippon Paint Co., Ltd., Osaka, Japan

[21] Appl. No.: 96,404

[22] Filed: Sep. 15, 1987

[30] Foreign Application Priority Data

Sep. 16, 1986 [JP]   Japan ................. 61-217781

[51] Int. Cl.$^4$ ............................................. C08L 43/00
[52] U.S. Cl. .................................. 523/122; 525/175; 525/201
[58] Field of Search .................. 523/122; 525/175, 201

[56] References Cited

U.S. PATENT DOCUMENTS 3,990,381 11/1976 Shepherd ............................ 427/265
4,133,788 1/1979 Sahajpal .............................. 524/458
4,482,701 11/1984 Yamamori .......................... 525/938
4,599,368 7/1986 Kimmel .............................. 523/122

Primary Examiner—Lewis T. Jacobs
Assistant Examiner—David Buttner
Attorney, Agent, or Firm—Wenderoth, Lind & Ponack

[57] ABSTRACT

An antifouling coating composition comprising (A) a film-forming polymer, (B) a volatile organic liquid diluent in which the polymer (A) is dissolved, (C) an antifouling agent and (D) optional other additives, characterizing by containing, in addition to said (A), (B), (C) and (D), disintegration type crosslinked acrylic resin microparticles having an average grain diameter of 0.01 to 250 $\mu$ and containing a number of metal ester bond bearing crosslinks uniformly distributed within the particle bodies, prepared by polymerizing 5 to 98% by weight of at least one metal ester bond bearing multifunctional polymerizable monomer defined in the specification 95 to 2% by weight of at least one polymerizable monomer other than said metal ester bond bearing multifunctional monomer, the solid weight ratio of said microparticles to the film-forming polymer being 1:99 to 77:30. The present antifouling coating composition can exhibit excellent polishing property and long-lasting antifouling effect.

8 Claims, No Drawings

ANTIFOULING COATING COMPOSITION

FIELD OF INVENTION

The present invention relates to an antifouling coating composition having improved polishing properties and long-lasting antifouling activities.

BACKGROUND OF THE INVENTION

An antifouling coating composition comprising a film-forming, thermoplastic or thermosetting polymer, an organic liquid diluent, an antifouling agent and other optional additives has been widely used as ship bottom paint, marine structure paint, fishnet paint and other similar use paints for the control of attachment of marine organisms or the like. However, in such coating compositions, since the film-forming polymer is usually of unhydrolyzable nature and the antifouling effect is entirely dependent upon the amount of antifouling agent dissolved out of the coating, there is a serious problem such that the desired antifouling effect can not last long. This is because, at the beginning stage in where the antifouling agent is dissolved out at the surface area of the coating, a higher antifouling effect can be realized therewith, and however, as it comes to the stage wherein the antifouling agent present in the surface area has already been thoroughly consumed and the agent contained in the inside of the coating is dissolved out as a consequence of diffusion due to the presence of concentration gradient, the desired antifouling effect is markedly decreased. Furthermore, after said dissolution, the coating will get skeleton structure, which in turn causes, in the case of ship bottom paint, a marked decrease in ship's speed and increase in fuel consumption. Under the circumstances, an antifouling paint based on a hydrolysis type resin has become the center of public attention. This type of coating composition is known as a polishing type antifouling paint. As the hydrolysis type resin, various polymers have been proposed as, for example, acrylic resins having electron attractive group bearing acyl bondings as halogenated aliphatic acid groups (e.g. Japanese patent application No. 101463/81 and ibid 198240/81); acrylic resins containing organic tin salts (e.g. Japanese patent application Kokai No. 98570/82); and polyester resins having metal ester bondings in the polymer main chain (e.g. Japanese patent application No. 165921/81 and ibid 165922/81) and the like. However, they were merely developed as resinous vehicles for antifouling paints, requireing film-forming properties and optimum film performance and therefore, there were in fact various limitations on the employable resins in respect of molecular weight, metal contents and the like, besides the hydrolysis natures thereof.

In a coating composition area, attempts have also been made to add, to a film-forming resinous varnish, resin powders for the improvement in application characteristics, without causing increase in viscosity, of the coating composition.

Therefore, even in an antifouling paint, hydrolysis type resin powders having no film-forming properties have been actually examined. For example, in Japanese patent publication No. 3830/86, are disclosed film-forming polymer compositions comprising a polyacrylic acid salt having a basic unit of the formula:

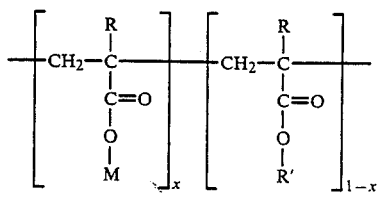

in which M stands for Cu or Zn.

It is stated that said polyacrylic acid salts may be of film-forming type or of non-film-forming type and the molecular weight is in a range of 5000 to $1 \times 10^6$.

Therefore, it is clear that hydrolysis type crosslinked resins having no film-forming properties are likewise suggested in this publication. However, in preparing said resins, a specific method is used therein, that is, a carboxyl bearing acrylic resin is first neutralized with caustic soda and dissolved in an aqueous medium and thus obtained polymer solution is reacted with a metal salt, thereby forming precipitation of insoluble polyacrylic acid salt. In this type of reaction, the soluble resin is gradually converted to insoluble type with the progress of ion-exchange reaction, and the formed insoluble resins are precipitated as amorphous masses each varying in size and shape. Since a smaller precipitate has a larger surface area and more rapidly hydrolyzed with sea water than a larger one, when the aforesaid precipitates are used in a self-polishing type antifouling paint, smaller precipitates are quickly hydrolyzed and consumed and larger precipitates are wastefully let out the coating with the dissolved resin.

Therefore, indeed an effective antifouling can be expected with the composition in an early stage, but a long-lasting effect cannot be obtained therewith. Furthermore, in the method of said Japanese patent publication No. 3830/86, an acrylic resin and a metal salt are reacted with each other each in aqueous solution form, and loss of solubility of the resin is the only cause of said precipitation. Since the reaction makes steady progress at the surface of precipitated resin interacted with aqueous metal salt solution, the metal ester bondings are always present in a higher concentration at the surface layers of the precipitates. Moreover, the precipitated resins do necessarily have a number of acid groups together with metal ester bondings, because precipitation is occured in an aqueous medium by the decrease in solubility of the resin. They are, therefore, too hygroscopic to use as the resinous filler in a polishing type antifouling paint. It is also pointed that it is quite difficult to control the metal ester containing crosslink density and carboxyl group content of the formed resin. For these reasons, a long-lasting antifouling effect cannot be expected with the coating composition added with the disclosed precipitates. Since the precipitates are not of spherical form, it is difficult to maintain them in a stabilized state of dispersion in a coating composition.

To the best of our knowledge, no antifouling coating compositions comprising hydrolysis type, insoluble polymer microparticles have been used so far.

It is, therefore, an object of the invention to provide a novel type of antifouling coating composition comprising a film-forming polymer, either hydrolysis type or non-hydrolysis type and either thermoplastic type or thermosetting type, an organic liquid diluent, an antifouling agent and other optional additives, added with polymer microparticles which are insoluble in the combination of said film-forming polymer and said organic liquid diluent, stably dispersed in the coating composition and thoroughly disintegrated from the interior and exterior of the respective particle in an ionic atmosphere, capable of resulting a coating with excellent polishing properties and long-lasting antifouling effects. An additional object of the invention is to provide an antifouling coating composition comprising disintegration type, crosslinked acrylic resin particles whose water susceptibility and hydrolysis rate are controllable each in appropriate optimum ranges at will. Other objects of the invention shall be clear from the descriptions of the specification and accompanied claims.

SUMMARY OF THE INVENTION

According to the invention, the aforesaid objects can be attained by a coating composition defined as "In an antifouling coating composition comprising (A) a film-forming polymer, (B) a volatile organic liquid diluent in which the polymer (A) is dissolved, (C) an antifouling agent and (D) optional other additives, the improvement comprising, in addition to said (A), (B), (C) and (D), disintegration type, crosslinked acrylic resin microparticles having an average grain diameter of 0.01 to 250μ and containing a number of metal ester bond bearing crosslinks uniformly distributed within the particle bodies, prepared by polymerizing 5 to 98% by weight of at least one metal ester bond bearing multifunctional polymerizable monomer represented by the formula

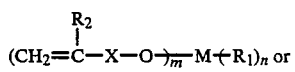 or

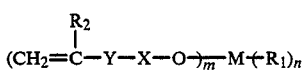

in which $R_2$ is hydrogen or methyl group; X is a radical selected from the group consisting of

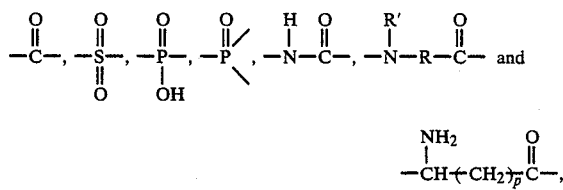

R' is hydrogen, methyl or ethyl group; R is a hydrocarbon residue having 1 to 20 carbon atoms; p is 0 or 1 to 5;

$R_1$ is a hydrocarbon residue having 1 to 10 carbon atoms; M stands for metal whose valency is 2 or more;

Y is an organic residue; m and n are positive integers fulfilling the requirements of $2 \leq m \leq q$ and $n = q - m$ in which q is equal to the metal valency, and 95 to 2% by weight of at least one polymerizable monomer other than said metal ester bond bearing multifunctional monomer, the solid weight ratio of said microparticles to the film-forming polymer being 1:99 to 70:30."

DESCRIPTION OF THE PREFERRED EMBODIMENTS

Thus, in the present invention, novel disintegration type crosslinked acrylic resin microparticles as defined hereinunder are uniformly dispersed in an antifouling coating composition comprising a film-forming polymer, an organic liquid diluent, an antifouling agent and other optional additives as pigment, hardener, catalyst, surface conditioner and the like.

The present microparticles are disintegration type crosslinked acrylic resin particles having an average grain diameter of 0.01 to 250μ and containing metal ester bond bearing crosslinks uniformly distributed within the particle bodies and are prepared by the method wherein a monomer mixture of (A) 5 to 98% by weight of metal ester bond bearing multifunctional polymerizable monomer represented by the formula:

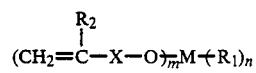

or

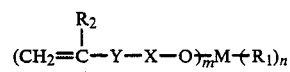

(in which $R_2$ represents hydrogen or methyl group; X is

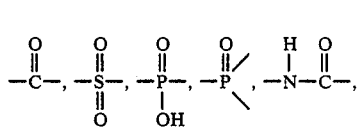

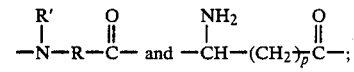

R' is hydrogen, methyl or ethyl group; R is a hydrocarbon residue having 1 to 20 carbon atoms; p is 0 or 1 to 5; $R_1$ is hydrocarbon residue having 1 to 10 carbon atoms; M is a metal whose valency is 2 or more; Y is an organic resiude; m and n are positive integers satisfying the conditions: $2 \leq m \leq q$, $n = q - m$ wherein q is equal to the metal valency) and 95 to 2% by weight of mono- or multi-functional polymerizable monomer other than said (A) having at least one α,β-ethylenically unsaturation bond, in a reaction medium which is unable to dissolve the formed polymer. The metal ester bond bearing multifunctional polymerizable monomers used in the preparation of the present resin particles are the compounds represented by either one of the following formulae:

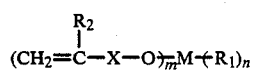

and

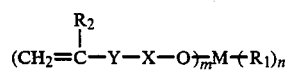

(wherein $R_2$, $R_1$, X, Y, M, m and n each have the same meaning as defined above) which are characterized by having at least 2 α,β-ethylenically unsaturated bondings and containing metal ester bonding in the molecule. Said compounds are crosslinking monomers and are used each singularly or in the combination of two or more.

The aforesaid monomers may be easily and advantageously prepared by reacting, under stirring, (a) a metal salt as metal oxide, metal hydroxide, metal sulfide and metal chloride, and
(b) a polymerizable unsaturated organic acid represented by the formula:

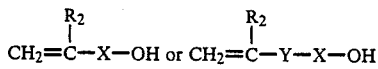

or alkali metal salt thereof, preferably in a solvent, at an elevated temperature which is lower than the decomposition temperature of said metal salt. Examples of said polymerizable unsaturated organic acids are methacrylic acid, acrylic acid, p-styrene sulfonic acid, 2-methyl-2-acrylamide propane sulfonic acid, 3-acid phosphoxy propyl methacrylate, 3-chloro-2-acid phosphoxy propyl methacrylate, 2-acid phosphoxy ethyl methacrylate, itaconic acid, itaconic anhydride, maleic acid, maleic anhydride, monoalkyl itaconate (e.g. methyl-, ethyl-, butyl-, 2-ethylhexyl-itaconates and the like), monoalkyl maleate (e.g. methyl-, ethyl-, butyl-, 2-ethylhexyl-maleates and the like), half-esters of acid anhydrides with hydroxyl containing polymerizable unsaturated monomers, for example, half-ester of acid anhydride as succinic anhydride, maleic anhydride, phthalic anhydride and the like, with 2-hydroxyethyl (meth) acrylate and the like. These organic acids are used each singularly or in the combination form of two or more.

As the metal component, any of the metals whose valences are 2 or more may be satisfactorily used. Such metals include the members that belong to the groups Ib, IIa, IIb, IIIa, IIIb, IVa, IVb, Va, Vb, VIIb and VIII of the Periodic Table. Preferably, said metal is selected from the group consisting of Cu, Zn, Ni, Co, Mn, Sn, Hg, Ti, Ge, Ga, Al and Mg.

Since the present resinous particles are, as minutely stated hereinunder, hydrolyzed at the metal ester bondings, in an ionic atmosphere and disintegrated into small resin segments bearing acid groups and metal ions, one may use the same as toxic substance source and resinous filler in an antifouling paint by selecting such toxic metals as Cu, Zn, Ni, Co, Mn, Sn, Hg and others which are toxic towards submarine living organisms. It is also possible to use other non-toxic metals as, for example, Ti, Ge, Ga, Al, Mg, Y, Sr, Zr, Bi, Ba, Ca, Fe and the like for hydrolysis purpose only. In this invention, the abovesaid metal ester bond bearing multifunctional polymerizable monomers are used in an amount corresponding to 5 to 98% by weight of the total monomers. This is because if the abovesaid multifunctional monomers are lss than 5% by weight of the total monomers used, the produced resin is dissolved in a polar solvent and thus cannot be maintained in the form of resinous particles in that solvent.

The other monomers used in an amount of 95 to 2% by weight with the abovesaid metal ester bond bearing multifunctional monomers are selected from monofunctional and multifunctional α,β-ethylenically unsaturated monomers, which may be classified as follows:
(1) carboxyl containing monomers, as, for example, acrylic acid, methacrylic acid, crotonic acid, itaconic acid, maleic acid, fumaric acid and the like,
(2) hydroxyl containing monomers, as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like,
(3) nitrogen containing alkyl (meth) acrylates, as, for example, dimethyl aminoethyl acrylate, dimethyl aminoethyl methacrylate and the like,
(4) polymerizable amides, as, for example, acrylamide, methacrylamide and the like,
(5) polymerizable nitriles, as, for example, acrylonitrile, methacrylonitrile and the like,
(6) alkyl acrylates and alkyl methacrylates, as, for example, methyl acrylate, methyl methacrylate, ethyl acrylate, ethyl methacrylate, n-butyl acrylate, n-butyl methacrylate, 2-ethyl hexyl acrylate and the like.
(7) polymerizable aromatic compounds, as, for example, styrene, α-methyl styrene, vinyl toluene, t-butyl styrene and the like,
(8) α-olefins, as, for example, ethylene, propylene and the like,
(9) vinyl compounds, as, for example, vinyl acetate, vinyl propionate and the like,
(10) diene compounds, as, for example, butadiene, isoprene and the like,
(11) metal containing monofunctional compounds, as, for example, vinyl ferrocene, trialkyl tin (meth) acrylate, γ-methacryloyl-oxy-trimethoxy silane and the like. Multifunctional polymerizable monomer other than said metal ester bond bearing polymerizable monomer may likewise be used, providing having 2 or more radically polymerizable, ethylenic bonds per molecule.

Examples of such monomers are polymerizable unsaturated monocarboxylic acid esters of polyhydric alcohols, polymerizable unsaturated alcohol esters of polycarboxylic acids, and aromatic compounds substituted with 2 or more vinyl groups and the like, including ethylene glycol diacrylate, ethylene glycol dimethacrylate, triethylene glycol dimethacrylate, tetraethylene glycol dimethacrylate, 1,3-butylene glycol dimethacrylate, trimethylol propane triacrylate, trimethylol propane trimethacrylate, 1,4-butanediol diacrylate, neopentyl glycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxy methyl ethane diacrylate, 1,1,1-trishydroxy methyl ethane triacrylate, 1,1,1-trishydroxy methyl ethane dimethacrylate, 1,1,1-trishydroxy methyl ethane trimethacrylate, 1,1,1-trishydroxy methyl propane diacrylate, 1,1,1-trishydroxy methyl propane triacrylate, 1,1,1-trishydroxy methyl propane dimethacrylate, 1,1,1-trishydroxy methyl propane trimethacrylate, triallyl cyanurate, triallyl isocyanurate, triallyl trimellitate, diallyl terephthalate, diallyl phthalate, divinyl benzene and the like.

The monomer mixture of 5 to 98% by weight of at least one of the aforesaid metal ester bond bearing multifunctional polymerizable monomers and 95 to 2% by weight of at least one of the abovesaid mono- or multifunctional polymerizable monomers is polymerized according to a conventional polymerization technique, in a reaction medium which cannot dissolve the formed polymer to give the present disintegration type crosslinked acrylic resin particles having an average grain diameter of 0.01 to 250μ. As the polymerization technique, any of the conventional emulsion polymerization, NAD polymerization, suspension polymerization, precipitation polymerization means may be satisfactorily used. The polymerization initiators used are also of conventional type. Typical examples are organic peroxides as benzoyl peroxide, t-butyl peroxide, cumene hydroperoxide and the like; organic azo compounds as azobiscyanovaleric acid, azobisisobutyronitrile, azobis(2,4-dimethyl)valeronitrile, azobis(2-amidinopropane)hydrochloride and the like; inorganic water soluble radical initiators as potassium persulfate, ammonium persulfate, hydrogen peroxide and the like; and redox type initiators comprising the abovesaid inorganic water soluble radical initiator and sodium pyrosulfite, sodium bisulfite or bivalent iron ions.

If desired, an appropriate amount of conventional chain transfer agent as, for example, lauryl mercaptan, hexyl mercaptan and the like may be used therewith.

In obtaining the present acrylic resin particles having relatively fine average grain diameter, e.g. 0.01 to 40μ, it is highly recommended to adopt an emulsion polymerization means wherein a monomer mixture is polymerized in water or aqueous medium containing water miscible organic solvent in the presence of an appropriate surfactant or resin. Water is then removed off from thus obtained emulsion by, for example, spray drying, solvent substitution, azeotropic distillation, filtration and drying, to obtain the resin particles.

The present resinous particles may also be prepared by polymerizing a mixture of the defined monomers in an organic solvent which can dissolve the monomers used but not the produced polymer as, for example, hexane, heptane, octane and other aliphatic hydrocarbons (by the so-called NAD polymerization method), or by adopting a conventional suspension polymerization or precipitation polymerization means. Pulverization and screening may be used for the control of the average grain diameter of the present resin particles.

In either method, the aforesaid metal ester bond bearing multifunctional polymerizable monomers and other copolymerizable monomers are copolymerized in a reaction medium which cannot dissolve the formed polymer, and therefore, thus obtained crosslinked acrylic resin particles of the invention are characterized by that they each have a distinct interface, and the metal ester bondings represented by the formula:

are necessarily included in the crosslinked portions of the resin molecule.

Thus, a number of the aforesaid metal ester bondings are uniformly distributed within the whole body of the resin particle.

Since the metal ester bonding is easily hydrolyzed under ionic atmosphere, the present acrylic resin particles are disintegrated under certain conditions by hydrolysis, and hence, they may be called, in that sence, as disintegration type or collapsible resin particles, in contrast to heretofore proposed hydrolyzable resin particles. Usually, the present acrylic resin particles have the crosslink density of said metal ester bond bearing crosslinks, expressed in terms of (number of moles of organic acid involved in the metal ester bond bearing crosslinks)/(gram of resin particles) of 0.00003 to 0.01 mol/g.

At the level of less than 0.00003 mol/g, no adequate and effective disintegration of the resin particles can be obtained, whereas at the level of more than 0.01 mol/g, considerable difficultis are encountered in the preparation of the resin particles.

In a most preferable embodiment of the invention, the said acrylic resin particles are prepared, each in spherical form, so that the crosslink density of metal ester bond bearing crosslinks in the center portion is much higher than those of the surface layers.

Such resin particles may be advantageously prepared by polymerizing the aforesaid monomer mixture in an appropriate reaction medium which cannot dissolve the metal ester bond bearing multifunctional polymerizable monomer as well as the formed polymer.

By the selection of other soluble monomers, the metal ester bonds are concentrated in the center portion of the particle body and the surface layers are mainly composed of said soluble monomers.

Solubility difference of the metal ester bond bearing multifunctional monomer and other polymerizable monomer in a defined reaction medium may also be utilized for the same purpose. By the selection of particular polymerizable monomer whose solubility in the reaction medium is much higher than the solubility of metal ester bond bearing multifunctional monomer, the metal ester crosslink density inclines toward the center portion of the respective resin particle.

In another method, monomer addition sequence or monomer ratio may be altered in the course of the polymerization. For example, monomer mixture with comparatively larger quantity of metal ester bond bearing multifunctional monomer or only metal ester bond bearing multifunctional monomer may be added to the reaction system in an early stage of polymerization and monomer mixture with lesser quantity of said multifunctional monomer in the later stage of the polymerization, thereby forming the double structured particle with metal ester rich core portion and metal ester poor shell portion. Location and amount of metal ester bonds in the present acrylic resin particles may be easily determined by simple analysis means. That is, metal ester bonds present in about 10 Å thickness of the acrylic resin particle may be easily determined both qualitatively and quantitatively by X-ray photoelectron spectroscopy (XPS) means. Depth profile of the included metal can be determined by adopting argon etching and XPS means in about 5 to 1000 Å thickness. X-ray fluorescence analysis method (XF method), electron probe X-ray micro analysis (EPMA), atomic absorption spectroscopy and the like may also be used in the determination of the metal content of the resin particles obtained.

Since the present crosslinked acrylic resin particles are mainly used as resinous filler in an antifouling paint the average grain diameter is limited in a range of 0.01 to 250μ, preferably from 0.01 to 70μ and most preferably from 0.02 to 20μ. This is because, if the grain diameter is less than 0.01μ, there are difficulties in actual handling of the resin particles due to dust problem and the like. This is because, if the grain diameter is less than 0.01μ, there are problems such that considerable difficulties are involved in the actual handling of the resin particles due to dusting or the like and that long-lasting antifouling effect cannot be attained with the resin particles because of their excessively higher decomposition speed in hydrolysis due to large specific surface area. On the other hand, if the average grain diameter is more than 250μ, there are problems such that only rough surface can be resulted with the coating composition and no effective disintegration of the resin particles can be expected therewith.

As a film-forming polymer, any of the members customarily used in a coating composition may be satisfactorily used, which may be either thermoplastic type or thermosetting type. Examples of such members are alkyd resin, oil-free polyester resin, acrylic resin, epoxy resin, phenol resin, chlorinated rubber, polyvinyl chloride resin, polyvinyl acetate resin, urethane resin, amino resin, silicone resin, and their modified resins as epoxy-, metal-, urethane- or amino-modified alkyd resin, epoxy-, metal-, urethane- or amino-modified polyester resin, epoxy-, metal-, urethane- or amino-modified acryl resin, and epoxy-, metal-, urethane- or amino-modified silicone resin.

The term "thermosetting type polymer" shall mean both self-crosslinking polymer and the polymer crosslinkable with the help of crosslinking agent as amino plast resin or polyisocyanate compound.

Though it is not essential in the invention, the film-forming polymer may be preferably be of hydrolysis nature. Such hydrolysis type, film-forming polymers have been well known in the art, and any of the known members used in a polishing type, antifouling paint may be satisfactorily and advantageously used. Examples are acrylic resins with electron attractive group bearing acyl groups as stated in Japanese Patent Application No. 101463/81 and ibid 198240/81; organic tin salt containing acrylic resins as disclosed in Japanese Patent Application Kokai No. 98570/82; metal ester bond containing polyester resins as stated in Japanese Patent Application No. 165921/81 and ibid 165922/81; acrylic resins having metal ester bond bearing side chains as disclosed in Japanese Patent Publication 3830/86, Japanese Patent Application Kokai Nos. 67761/83, 67767/83, 118868/83 and Japanese Patent Application 106434/85 and the like.

As the organic liquid diluent, any of the known volatile organic solvents customarily used in an antifouling paint and capable of dissolving the film-forming polymer may satisfactorily used, as, for example, aliphatic hydrocarbons, aromatic hydrocarbons, halogenated hydrocarbons, alcohols, ketones, esters, ethers, alcohol-esters, ketone-esters, ether-alcohols, ketone-ethers, ketone-esters, ester-ethers and the like.

As the antifouling agent, any of the known members may satisfactorily used, including the following:

1. trialkyl tin compounds: e.g. tributyl tin oxide, tributyl tin hydroxide, tributyl tin chloride, tributyl tin acetate, tributyl tin fumarate, bis(tri-n-butyl tin)mesodibromo succinate, bis(tri-n-butyl tin)oxide.
2. triphenyl tin compounds: e.g. triphenyl tin hydroxide, triphenyl tin chloride, triphenyl tin fluoride, triphenyl tin acetate, triphenyl tin dimethyl dithio carbamate, triphenyl tin versatate, triphenyl tin nicotinate, triphenyl tin $\alpha,\alpha'$-dibromo succinate, and triphenyl tin mono-chrom acetate.
3. triphenyl leads: e.g. triphenyl lead acetate, tributyl lead acetate.
4. thiocarbamates: e.g. zinc dimethyl dithiocarbamate, tetramethyl thiuram disulfide.
5. copper compounds: e.g. cuprous oxide, cuprous thiocyanate, copper rhodanate, copper phosphide, copper naphthenate, copper octoate, alkyl mercaptan copper methyl.
6. Others: e.g. antimony oxide, mercuric oxide arsenitic anhydride, 2,4-dichlorophenoxy acetic acid, 2-methyl-4-chlorophenoxy acetic acid, pentachlor-phenol dodecylamine, pentachlorphenol, triphenyl borane amine.

The invention however should not be limited on the abovesaid antifouling agents and other known antifouling agents may satisfactorily be used.

Coloring matters, surface conditioners, catalysts, solvents and the like may be added as optional additives if desired. The present coating compositions are provided by uniformly mixing the aforesaid ingredients in a conventional way, using, for example, ball-mill, pebble mill, roll mill, speed run mill and the like. The novelty of the present invention resides in the point that the abovementioned disintegration type, crosslinked acrylic resin microparticles are uniformly dispersed in a conventional antifouling coating composition comprising a film-forming polymer, a volatile organic liquid diluent, an antifouling agent and other optional additives. At that time, the solid weight ratio of said microparticles to the film-forming polymer is determined in a range of 1:99 to 70:30.

This is because, if the microparticle content is lower than the aforesaid lower limit, it is unable to expect the desired polishing effect and if it is over the aforesaid upper limit, there is a tendency that film-forming property of the coating composition is markedly lowered.

The present microparticles are, as already stated, hydrolyzed in an ionic atmosphere, and disintegrated from the interior and exterior of the respective particle at once. Therefore, when compounded with an antifouling paint, the formed coating is decomposed depthward in an ionic atmosphere, little by little, from the surface thereof. Since the metal ester bond containing crosslink density and hydrophilic group content of the microparticle resin can be freely controlled, one may design any antifouling coating compositions with desired polishing rates. The microparticles are provided in general in spherical form and the mean diameter is fairly well controlled, and therefore, steady and long-lasting antifouling effect and polishing effect can be attained with the coating obtained by using the present coating composition.

Usually, the desired antifouling effect is relied on the antifouling agent contained in the coating composition and the polishing effect on the disintegration type, crosslinked acrylic resin microparticles and, when selected, the hydrolysis type film-forming polymer. However, when toxic metal ions are generated from the used microparticles and hydrolysis type film-forming polymer, the antifouling effect may be thoroughly or partly relied on these toxic metal ions generated. Therefore, in the present invention, the antifouling agent in certain circumstances, may be omitted from the present coating composition.

In the most preferable embodiment of the invention, the antifouling coating composition comprises a hydrolysis type, thermosetting film-forming polymer, a volatile organic liquid diluent, an antifouling agent and disintegration type, crosslinked acrylic resin microparticles, as well as pigment and other optional additives.

The invention shall be now more fully explained in the following examples. Unless otherwise being stated, all parts and percentages are by weight.

Manufacturing Example 1

Into a four-necked flask fitted with a stirrer and a reflux condenser, were placed 700 parts of isopropyl alcohol and 300 parts of deionized water and the mixture was heated to 75° to 85° C. While maintaining the same temperature, 40 parts of zinc dimethacrylate, 60 parts of methyl methacrylate and 2 parts of azobisisobutyronitrile were added to said solution and the combined mixture was stirred and reacted for 5 hours. Thereafter, the mixture was filtered and thus separated particles were dried. Acrylic resin particles (P-1) having an average grain diameter of 1.1μ were obtained, whose zinc content determined by XF method (X-ray fluorescent method) was 94000 ppm. In XPS analysis, clear peaks derived from 2p of Zn were observed at 1020 and 1044 eV. After etching the surface layer in 200 Å and 400 Å thickness with argon gas, the peak intensities were again examined by XPS and 1.2 times and 1.3 times stronger peaks were observed, respectively.

From these test results, it was concluded that the metal ester bond containing crosslinks were uniformly distributed in much higher concentration in the inside of particle body than the surface layer thereof.

Manufacturing Example 2

The same procedures as stated in Manufacturing Example 1 were repeated, excepting substituting 40 parts of gallium trimethacrylate for 40 parts of zinc dimethacrylate. Acrylic resin particles (P-2) having an average primary grain diameter of 1.0μ were obtained.

Manufacturing Example 3

The same procedures as stated in Manufacturing Example 1 were repeated, excepting substituting 20 parts of nickel dimethacrylate and 20 parts of iron trimethacryl ethyl phosphate for 40 parts of zinc dimethacrylate, to obtain acrylic resin particles (P-3) having an average primary grain diameter of 1.4μ.

Manufacturing Example 4

The same procedures as stated in Manufacturing Example 1 were repeated, excepting substituting 40 parts of titanium dimethacryl ethyl phosphate for 40 parts of zinc dimethacrylate to obtain acrylic resin particles (P-4) having an average primary grain diameter of 0.8μ.

Manufacturing Example 5

(1) Preparation of emulsifier having amphoionic groups:

Into a 2 liters flask fitted with a stirrer, a nitrogen gas inlet tube, a thermoregulator, a condenser and a decanter, were placed 134 parts of bishydroxy ethyl taurine, 130 parts of neopentyl glycol, 236 parts of azelaic acid, 186 parts of phthalic anhydride and 27 parts of xylene and the mixture was heated while removing the formed water azeotropically. The temperature was raised to 190° C. in about 2 hours from the commencement of reflux, both stirring and dehydration were continued until the acid value (equivalent to carboxylic acid) reached 145, and the mixture was then allowed to cool to 140° C. While maintaining the temperature at 140° C., 34 parts of glycidyl versatate (Cardura E-10, trademark of Shell Co.) were dropwise added in 30 minutes and the combined mixture was further stirred for 2 hours and the reaction was over. Thus obtained polyester resin had an acid value of 59, a hydroxyl value of 90 and a number average molecular weight of 1054, which was hereinafter referred to as emulsifier A.

(2) Preparation of acrylic resin particles:

Into a 2 liters reactor fitted with a stirrer, a condenser and a thermoregulator, were placed 380 parts of deionized water, 50 parts of the emulsifier A and 5 parts of dimethyl ethanol amine and the mixture was heated, under stirring, to 80° C. to get a solution. To this, were dropwise and simultaneously added with a solution of 2.5 parts of azobiscyanovaleric acid in 50 parts of deionized water and 1.6 parts of dimethyl ethanol amine, a mixed solution of 100 parts of methyl methacrylate, 40 parts of styrene and 35 parts of n-butyl acrylate and a solution of 75 parts of dibutyl tin dimethacrylate in 252 parts of deionized water in 90 minutes and thereafter, the combined mixture was further stirred for 90 minutes to obtain an aqueous dispersion of acrylic resin particles having an average primary grain diameter of 48 mμ. This dispersion was then subjected to a freeze drying to obtain the acrylic resin particles (P-5), whose tin content determined by XF method was 72000 ppm. EPS analysis of thus obtained particles showed clear peaks derived from 3d and 3p of Sn at 490 eV and 715 eV, respectively. After 200 Å and 400 Å etching with argon gas, EPS analysis was again conducted with the etched particles. 2.5 times and 4.2 times stronger peaks were observed.

From these test results, it is clear that metal ester bonds are highly concentrated in the inside of the respective particle as compared with the surface layer.

Manufacturing Example 6

Into a 1 liter reactor fitted with a stirrer, a condenser and a thermoregulator, were placed 1000 parts of deionized water and 30 parts of polyvinyl alcohol (average molecular weight 1500) and the mixture was, while stirring at 1000 rpm and purging with nitrogen gas, heated to 60° C. To this, were dropwise and simultaneously added a mixture of 20 parts of tributyl tin methacrylate, 13 parts of methyl methacrylate, 2 parts of 2-hydroxyethyl acrylate and 1 part of 2,2'-azobis-(2,4-dimethyl valeronitrile) (polymerization initiator, V-65, trademark of Wakoh Junyaku Kogyo K.K.) and a solution of 15 parts of tetra-methacrylic titanate in 150 parts of deionized water in 1 hour. After completion of said addition, the combined mixture was heated at 70° C. and reacted for 5 hours to obtain a suspension of resinous fine particles. The suspension was then subjected to a centrifugal separation and the precipitated resinous particles were separated from the supernatant and again dispersed in deionized water. The abovesaid centrifugal separation and redispersion in deionized water operations were repeated three times to obtain acrylic resin particles (P-6) having an average primary grain diameter of 7.5μ.

Manufacturing Example 7

The same procedures as stated in Manufacturing Example 1 were repeated, excepting substituting 40 parts of yttrium dimethacrylate for 40 parts of zinc dimethacrylate, to obtain acrylic resin particles (P-7) having an average primary grain diameter of 1.4μ.

Manufacturing Example 8

The same procedures as stated in Manufacturing Example 1 were repeated, excepting substituting 30 parts of strontrium dimethacrylate for 40 parts of zinc dimethacrylate, and 30 parts of methyl methacrylate and 30 parts of n-butyl acrylate for 60 parts of methyl methacrylate, to obtain acrylic resin particles (P-8) having an average primary grain diameter of 2.1μ.

Manufacturing Example 9

The same procedures as stated in Manufacturing Example 1 were repeated, excepting substituting 8 parts of copper salt of 3-acid phosphoxy propyl methacrylate and 32 parts of divinyl benzene for 40 parts of zinc dimethacrylate, to obtain acrylic resin particles (P-9) having an average primary grain diameter of 5μ.

Manufacturing Example 10

The same procedures as stated in Manufacturing Example 1 were repeated, excepting substituting 60 parts of cobalt di-2-methyl-2-acrylamide-propane sulfonate for 40 parts of zinc dimethacrylate and 40 parts of methyl methacrylate for 60 parts of methyl methacrylate, to obtain acrylic resin particles (P-10) having an average primary grain diameter of $3\mu$.

Manufacturing Example 11

The same procedures as stated in Manufacturing Example 1 were repeated, excepting substituting 50 parts of dioctyl tin dimethacrylate for 40 parts of zinc dimethacrylate and 50 parts of methyl methacrylate for 60 parts of methyl methacrylate, to obtain acrylic resin particles (P-11) having an average primary grain diameter of $3\mu$.

Manufacturing Example 12

Into a four-necked flask fitted with a reflux condenser, a stirrer and a nitrogen gas inlet tube, were placed 800 parts of n-heptane, 15 parts of tetramethacrylic titanate, 85 parts of methyl methacrylate and 3 parts of azobisisobutyronitrile and the mixture was heated, under nitrogen stream, at 75° to 80° C. and reacted for 4 hours. With the progress of polymerization, fine particles of resinous material were appeared and settled in the reaction system. After filtration, thus separated product was subjected to drying to obtain acrylic resin particles (P-12) having an average primary grain diameter of $7\mu$.

Manufacturing Example 13

The same procedures as stated in Manufacturing Example 12 were repeated, excepting substituting 10 parts of tetramethacrylic titanate and 20 parts of manganese dimethacrylate, 50 parts of methyl methacrylate and 20 parts of n-butyl methacrylate for 15 parts of tetramethacrylic titanate and 85 parts of methyl methacrylate, to obtain acrylic resin particles (P-13) having an average primary grain diameter of $1.5\mu$.

Manufacturing Example 14

The same procedures as stated in Manufacturing Example 12 were repeated, excepting substituting 30 parts of tetramethacrylic zirconate, 50 parts of methyl methacrylate and 20 parts of n-butyl methacrylate for 15 parts of tetramethacrylic titanate and 85 parts of methyl methacrylate, to obtain acrylic resin particles (P-14) having an average primary grain diameter of $2\mu$.

Manufacturing Example 15

The same procedures as stated in Manufacturing Example 12 were repeated, excepting substituting 40 parts of gallium trimethacrylate and 60 parts of methyl methacrylate for 15 parts of tetramethacrylic titanate and 85 parts of methyl methacrylate, to obtain acrylic resin particles (P-15) having an average primary grain diameter of $1.5\mu$.

Manufacturing Example 16

The same procedures as stated in Manufacturing Example 12 were repeated, excepting substituting 35 parts of Bismuth salt of 3-acid phosphoxy propyl methacrylate and 65 parts of methyl methacrylate for 15 parts of tetramethacrylic titanate and 85 parts of methyl methacrylate, to obtain acrylic resin particles (P-16) having an average primary grain diameter of $4\mu$. In each of the aforesaid Manufacturing Examples 1 to 16, the presence of the used metal element in the final resin particles was confirmed by a qualitative analysis of the produced resin particles using Energy Dispersion Type X-ray Analyser (EDX) fitted with Scanning Electron Microscope (SEM).

Manufacturing Example 17

The same procedures as stated in Manufacturing Example 5 were repeated, excepting substituting 75 parts of aluminium tri-N-methacryloyl carbamate for 75 parts of dibutyl tin dimethacrylate, to obtain acrylic resin particles (P-17) having an average primary grain diameter of $60\mu$.

Comparative Manufacturing Example 1

The same procedures as stated in Manufacturing Example 1 were repeated, excepting substituting 40 parts of ethylene glycol dimethacrylate for 40 parts of zinc dimethacrylate, to obtain Comparative acrylic resin particles A.

Comparative Manufacturing Example 2

The same procedures as stated in Manufacturing Example 1 were repeated, excepting substituting 0.1 part of zinc dimethacrylate for 40 parts of zinc dimethacrylate, and 40 parts of methyl methacrylate and 19 parts of n-butyl acrylate for 60 parts of methyl methacrylate, to obtain Comparative acrylic resin particles B.

Comparative Manufacturing Example 3

To a stirred 500 ml of aqueous 20% solution of copolymer of sodium methacrylate and methyl methacrylate (37:60 parts by weight), were dropwise added 41 parts of $ZnSO_4.7H_2O$. The formed precipitates were centrifuged, washed several times with distilled water and dried in a vacuum furnace at 50° C. to obtain Comparative acrylic resin particles B, whose Zn content measured by XF method was 95000 ppm. XPS analysis showed clear peaks derived from 2p of Zn at 1020 and 1044 eV.

Manufacturing Example 18

Preparation of resinous varnish A

Into a four necked flask fitted with a reflux condenser, a stirrer, a nitrogen gas inlet tube and a dropping funnel, were placed 80 parts of xylene and heated to 90° C. To this, a mixture of 25 parts of 2-ethylhexyl methacrylate, 45 parts of methyl methacrylate, 30 parts of n-butyl acrylate and 2 parts of azobisisobutyronitrile was dropwise added at a constant speed in 4 hours and the combined mixture was maintained at the same temperature for 30 minutes. Thereafter, a mixture of 20 parts of xylene and 0.2 part of azobisisobutyronitrile was dropwise added to the abovesaid reaction mixture in 1 hour and the resulted mixture was maintained at 90° C. for 2 hours to obtain a resinous varnish A having a solid content of 50.2 wt%.

Manufacturing Example 19

Preparation of resinous varnish B

Into a similar reaction vessel as used in Manufacturing Example 18, were placed 60 parts of xylene and 15 parts of n-butanol and the mixture was heated to 90° C. To this, a mixture of 25 parts of methyl methacrylate, 45 parts of n-butyl acrylate, 25 parts of isobutyl methacrylate, 5 parts of 2-hydroxyethyl acrylate and 1.5 parts of azobisisobutyronitrile was dropwise added in 3 hours and the combined mixture was maintained at the same temperature for 30 minutes. Thereafter, a mixture of 15 parts of xylene, 10 parts of n-butanol and 0.5 part of azobisisobutyronitrile was dropwise added in hour and the resulted mixture was maintained at 90° C. for 2 hours to obtain a resinous varnish B having a solid content of 49.7 wt%.

Manufacturing Example 20

Preparation of resinous varnish C

Into a four necked flask fitted with a stirrer, a reflux condenser, a nitrogen gas inlet tube and a decanter, were placed 5 parts of xylene, 25 parts of coconut oil fatty acid, 19.3 parts of 1,6-hexanediol, 8.2 parts of trimethylolpropane, 44.5 parts of phthalic anhydride and 0.2 part of dibutyl tin oxide and the mixture was reacted at 190°–220° C. while removing the formed water out of the system. The reaction end point was determined by checking the amount of water recovered and the resinous acid value (5 mg/KOH). After completion of the reaction, the content was allowed to cool and diluted with 80 parts of xylene and 15 parts of butyl acetate to obtain a resinous varnish C having a solid content of 49.8 wt%.

Manufacturing Example 21

Preparation of resinous varnish D

Into a four necked flask fitted with a reflux condenser, a stirrer, a nitrogen gas inlet tube and a dropping funnel, were placed 80 parts of xylene and heated to 85° C. To this, a mixture of 55 parts of methyl methacrylate, 45 parts of tributyl tin methacrylate and 1.5 parts of azobisisobutyronitrile was dropwise added in 3 hours and the combined mixture was maintained at 85° C. for 30 minutes. Thereafter, a mixture of 20 parts of xylene and 0.3 parts of azobisisobutyronitrile was dropwise added to the reaction mixture in 1 hour and the resulted mixture was maintained at the same temperature for 2 hours to obtain a resinous varnish D having a solid content of 49.2 wt%.

Manufacturing Example 22

Preparation of resinous varnish E

Into a four necked flask fitted with a stirrer, a reflux condenser and a dropping funnel, were placed 120 parts of xylene and 30 parts of n-butanol and the mixture was heated to 110° to 120° C. To this, a mixture of 60 parts of ethyl acrylate, 25 parts of 2-ethylhexyl acrylate, 15 parts of acrylic acid and 2 parts of azobisisobutyronitrile was dropwise added at a constant speed in 3 hours and the combined mixture was maintained at the same temperature for 2 hours to obtain a resinous varnish having a solid content of 39.8 wt% and a viscosity of 2.2 poises.

Into a separate four necked flask fitted with a stirrer, a reflux condenser and a decanter, were placed 100 parts of the aforesaid resinous varnish, 20 parts of naphthenic acid (acid value 200 KOH mg/g) and 7 parts of copper hydroxide and the mixture was heated to 120° C. and maintained at the same temperature for 2 hours, while removing the formed water (the amount of water recovered was 2.5 g). Thus, a green colored resinous varnish E having a solid content of 51.3 wt% was obtained. A part of said varnish was added to white spirit to precipitate the contained resin and copper content of said resin was analyzed by fluorescent X-ray method. Said resin contained 6.8 wt% Cu.

Examples 1 to 27 and Comparative Examples 1 to 6

Using the materials shown in Table 1, Table 2 and Table 3, each in indicated amounts and subjecting the mixture thus obtained to a dispersion operation in ball mill for 5 hours, the respective coating composition was prepared. Each composition was then applied onto a test plate in about 200 microns dry thickness, and thus prepared test plate was attached to Discrotor, immersed in sea water (18° to 23° C.) and rotated at a constant speed (peripheral speed 35 knots) for 3 months (days and nights). Use-up rate of the respective coating was determined microscopically and the test results were shown in Table 4. Incidentally, severe increase in viscosity of the coating composition was observed in Comparative Examples 5 and 6, respectively.

TABLE 1

| | Example No. | | | | | |
|---|---|---|---|---|---|---|
| | 1 | 2 | 3 | 4 | 5 | 6 |
| microparticles | | | | | | |
| P-1 | 3 | | | | | |
| P-2 | | 0.5 | | | | |
| P-3 | | | 7 | | | |
| P-4 | | | | 12 | | |
| P-5 | | | | | 10 | |
| P-6 | | | | | | 6 |
| P-7 | | | | | | |
| P-8 | | | | | | |
| P-9 | | | | | | |
| P-10 | | | | | | |
| P-11 | | | | | | |
| P-12 | | | | | | |
| varnish | | | | | | |
| A | 40 | 35 | 40 | 40 | 40 | |
| B | | | | | | 45 |
| C | | | | | | |
| D | | | | | | |
| cuprous oxide | 15 | 25 | 15 | 10 | 20 | 5 |
| zinc white | | 5 | 20 | 15 | 15 | 15 |
| colloidal silica | 3 | 3 | 3 | 3 | 3 | 3 |
| talc | 10 | 6 | 5 | | | |
| red oxide | 5 | 7 | 5 | 5 | | |
| xylene | 19 | 13.5 | | 10 | 7 | |
| n-butanol | 5 | 5 | 5 | 5 | 5 | 5 |
| total | 100 | 100 | 100 | 100 | 100 | 100 |

| | Example No. | | | | | |
|---|---|---|---|---|---|---|
| | 7 | 8 | 9 | 10 | 11 | 12 |
| microparticles | | | | | | |
| P-1 | | | | | | |
| P-2 | | | | | | |
| P-3 | | | | | | |
| P-4 | | | | | | |
| P-5 | | | | | | |
| P-6 | | | | | | |
| P-7 | 15 | | | | | |
| P-8 | | 10 | | | | |
| P-9 | | | 8 | | | |
| P-10 | | | | 10 | | |
| P-11 | | | | | 8 | |
| P-12 | | | | | | 12 |
| varnish | | | | | | |
| A | | | | | | 45 |
| B | 35 | 35 | | | 35 | |
| C | | | 35 | 25 | | |
| D | | | | | | |
| cuprous oxide | 10 | 20 | 10 | 10 | 20 | 15 |
| zinc white | 5 | 15 | 20 | 17 | 15 | |
| colloidal silica | 3 | 3 | 3 | 3 | 3 | 3 |
| talc | 10 | | 5 | 10 | 4 | |
| red oxide | 5 | 4 | 5 | | | 5 |
| xylene | 6 | 12 | 10 | 15 | 10 | 15 |
| n-butanol | 5 | 5 | 5 | 5 | 5 | 5 |

TABLE 1-continued

| | | | | | | |
|---|---|---|---|---|---|---|
| total | 100 | 100 | 100 | 100 | 100 | 100 |

TABLE 2

| | Example No. | | | | | |
|---|---|---|---|---|---|---|
| | 13 | 14 | 15 | 16 | 17 | 18 |
| microparticles | | | | | | |
| P-1 | 10 | | | | | |
| P-2 | | 15 | | | | |
| P-13 | | | 10 | | | |
| P-14 | | | | 10 | | |
| P-15 | | | | | 12 | |
| P-16 | | | | | | 8 |
| Comp. particles | | | | | | |
| A | | | | | | |
| B | | | | | | |
| chlorinated rubber | | | 25 | | | |
| varnish | | | | | | |
| A | 35 | | | 30 | | |
| B | | 25 | | | | 40 |
| D | | | | 30 | | |
| curpous oxide | | 15 | 25 | 20 | | |
| zinc white | | 10 | 10 | 15 | | |
| cupous thiocyanate | 25 | | | | 10 | 15 |
| Cu powder | | 3 | | | | |
| titanium oxide | 5 | 5 | 2 | 5 | | 10 |
| colloidal silica | 3 | 3 | 3 | 3 | 3 | 3 |
| talc | | | 10 | | | 9 |
| red oxide | 2 | 4 | | | | |
| xylene | 15 | 15 | 10 | 12 | 40 | 10 |
| n-butanol | 5 | 5 | 5 | 5 | 5 | 5 |
| Total | 100 | 100 | 100 | 100 | 100 | 100 |

| | Comp. Example No. | | | |
|---|---|---|---|---|
| | 1 | 2 | 3 | 4 |
| microparticles | | | | |
| P-1 | | | | |
| P-2 | | | | |
| P-13 | | | | |
| P-14 | | | | |
| P-15 | | | | |
| P-16 | | | | |
| Comp. particles | | | | |
| A | | 8 | | |
| B | | | 10 | |
| chlorinated rubber | | | | |
| varnish | | | | |
| A | 40 | | | |
| B | | 40 | 30 | |
| D | | | | 40 |
| cuprous oxide | 15 | 10 | 10 | |
| zinc white | 10 | 15 | | |
| cuprous thiocyanate | | | | 15 |
| Cu powder | | | | |
| titanium oxide | | | 10 | 5 |
| colloidal silica | 3 | 3 | 3 | 3 |
| talc | 10 | 10 | 15 | 15 |
| red oxide | | | 8 | 5 |
| xylene | 9 | 7 | 19 | 12 |
| n-butanol | 5 | 5 | 5 | 5 |
| Total | 100 | 100 | 100 | 100 |

TABLE 3

| | Example No. | | | | | |
|---|---|---|---|---|---|---|
| | 19 | 20 | 21 | 22 | 23 | 24 |
| microparticles | | | | | | |
| P-1 | | | 10 | 15 | | |
| P-9 | | 5 | | | 20 | |
| P-10 | | | | | | 25 |
| P-11 | | | | | | |
| P17 | 10 | | | | | |
| Comp. particles C | | | | | | |
| varnish | | | | | | |
| A | | | | 80 | | |
| B | 40 | | | | 80 | |
| C | | | | | | 75 |
| D | | | | | | |
| E | | 35 | 35 | | | |
| cuprous oxide | 35 | 15 | 15 | | | |
| zinc white | | 5 | | | | |
| titanium oxide | | | | | | |
| colloidal silica | 3 | 3 | 3 | | | |
| talc | 5 | 10 | 10 | | | |
| red oxide | 5 | 10 | 10 | | | |
| xylene | | 10 | 10 | | | |
| n-butanol | 2 | 7 | 7 | 5 | | |
| Total | 100 | 100 | 100 | 100 | 100 | 100 |

| | Example No. | | | | |
|---|---|---|---|---|---|
| | 25 | 26 | 27 | Comp. 5 | Comp. 6 |
| microparticles | | | | | |
| P-1 | | | | | |
| P-9 | | | 30 | | |
| P-10 | | | | | |
| P-11 | 15 | | | | |
| P-17 | | 15 | | | |
| Comp. particles C | | | | 10 | 5 |
| varnish | | | | | |
| A | | 85 | | 30 | |
| B | | | | | |
| C | | | | | |
| D | 85 | | | | 30 |
| E | | | 70 | | |
| cuprous oxide | | | | 35 | 40 |
| zinc white | | | | | |
| titanium oxide | | | | 5 | 5 |
| colloidal silica | | | | 3 | 3 |
| talc | | | | | |
| red oxide | | | | | |
| xylene | | | | 10 | 10 |
| n-butanol | | | | 7 | 7 |
| Total | 100 | 100 | 100 | 100 | 100 |

TABLE 4

(Coating Use-up rate)

| Example | initial film thickness (μ) | film thickness after 3 months (μ) | use-up film thickness (μ) |
|---|---|---|---|
| 1 | 190 | 180 | 10 |
| 2 | 195 | 190 | 5 |
| 3 | 200 | 190 | 10 |
| 4 | 210 | 190 | 20 |
| 5 | 195 | 175 | 20 |
| 6 | 200 | 185 | 15 |
| 7 | 180 | 150 | 30 |
| 8 | 200 | 180 | 20 |
| 9 | 210 | 190 | 20 |
| 10 | 205 | 175 | 30 |
| 11 | 180 | 165 | 15 |
| 12 | 195 | 170 | 25 |
| 13 | 210 | 185 | 25 |
| 14 | 220 | 185 | 35 |
| 15 | 180 | 165 | 15 |
| 16 | 200 | 180 | 20 |
| 17 | 200 | 175 | 25 |
| 18 | 195 | 180 | 15 |
| 19 | 195 | 175 | 20 |
| 20 | 190 | 145 | 45 |
| 21 | 210 | 175 | 35 |
| 22 | 190 | 175 | 15 |
| 23 | 195 | 180 | 15 |
| 24 | 190 | 180 | 10 |
| 25 | 180 | 150 | 30 |
| 26 | 200 | 180 | 20 |
| 27 | 195 | 145 | 50 |
| Comp. Example | | | |
| 1 | 220 | 220 | 0 |
| 2 | 190 | 190 | 0 |
| 3 | 195 | 195 | 0 |
| 4 | 190 | 190 | 0 |
| 5 | 200 | 120 | 80 |

TABLE 4-continued

| | (Coating Use-up rate) | | |
|---|---|---|---|
| | initial film thickness (μ) | film thickness after 3 months (μ) | use-up film thickness (μ) |
| 6 | 210 | 40 | 170 |

Next, the respective coating composition of Examples 1 to 27 and Comparative Examples 1 to 6 was applied twice by brushing onto a sand-blasted steel plate previously coated with an anti-corrosive paint, so as to give a coating of 100 microns dry thickness each time. Thus prepared test plates were immersed in sea water for a defined period of time and their antifouling effects were examined. These tests were conducted at Aioi Bay, Hyogo Pref., Japan. The results are shown in Table 5.

TABLE 5

Antifouling test results (surface area % adhered with submarine livings)

| | duration of immersion (months) | | | | | | |
|---|---|---|---|---|---|---|---|
| | 1 | 3 | 6 | 9 | 12 | 18 | 24 |
| Example | | | | | | | |
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |
| 6 | 0 | 0 | 0 | 0 | 0 | 0 | 0 |
| 7 | 0 | 0 | 0 | 0 | 0 | 0 | 0 |
| 8 | 0 | 0 | 0 | 0 | 0 | 0 | 0 |
| 9 | 0 | 0 | 0 | 0 | 0 | 0 | 0 |
| 10 | 0 | 0 | 0 | 0 | 0 | 0 | 0 |
| 11 | 0 | 0 | 0 | 0 | 0 | 0 | 0 |
| 12 | 0 | 0 | 0 | 0 | 0 | 0 | 0 |
| 13 | 0 | 0 | 0 | 0 | 0 | 0 | 0 |
| 14 | 0 | 0 | 0 | 0 | 0 | 0 | 0 |
| 15 | 0 | 0 | 0 | 0 | 0 | 0 | 0 |
| 16 | 0 | 0 | 0 | 0 | 0 | 0 | 0 |
| 17 | 0 | 0 | 0 | 0 | 0 | 0 | 0 |
| 18 | 0 | 0 | 0 | 0 | 0 | 0 | 0 |
| 19 | 0 | 0 | 0 | 0 | 0 | 0 | 0 |
| 20 | 0 | 0 | 0 | 0 | 0 | 0 | 0 |
| 21 | 0 | 0 | 0 | 0 | 0 | 0 | 0 |
| 22 | 0 | 0 | 0 | 0 | 0 | 0 | 0 |
| 23 | 0 | 0 | 0 | 0 | 0 | 0 | 0 |
| 24 | 0 | 0 | 0 | 0 | 0 | 0 | 0 |
| 25 | 0 | 0 | 0 | 0 | 0 | 0 | 0 |
| 26 | 0 | 0 | 0 | 30 | 80 | 100 | 100 |
| 27 | 0 | 0 | 0 | 0 | 0 | 0 | 0 |
| Comp. Example | | | | | | | |
| 1 | 0 | 5 | 30 | 100 | 100 | 100 | 100 |
| 2 | 0 | 10 | 30 | 100 | 100 | 100 | 100 |
| 3 | 0 | 20 | 50 | 100 | 100 | 100 | 100 |
| 4 | 0 | 0 | 5 | 50 | 100 | 100 | 100 |
| 5 | 0 | 0 | 0 | 80 | 100 | 100 | 100 |
| 6 | 0 | 0 | 100 | 100 | 100 | 100 | 100 |

What is claimed is:

1. In an antifouling coating composition comprising (A) a film-forming polymer, (B) a volatile organic liquid diluent in which the polymer (A) is dissolved, (C) an antifouling agent and (D) optionally other additives, the improvement comprising, in addition to said (A), (B), (C) and (D), disintegration type, crosslinked acrylic resin microparticles having an average grain diameter of 0.01 to 250μ and containing a number of metal ester bond bearing crosslinks uniformly distributed within the particle bodies, prepared by polymerizing 5 to 98% by weight of at least one metal ester bond bearing multifunctional polymerizable monomer represented by the formula:

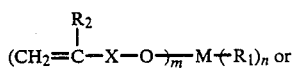 or

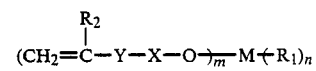

in which $R_2$ is hydrogen or a methyl group; X is a radical selected from the group consisting of

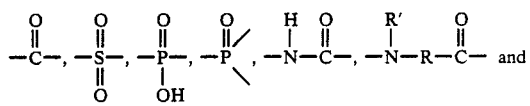 and

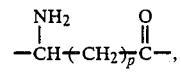

$R'$ is a hydrogen, methyl or ethyl group; R is a hydrocarbon residue having 1 to 20 carbon atoms; p is 0 or 1 to 5; $R_1$ is a hydrocarbon residue having 1 to 10 carbon atoms; M stands for metal whose valency is 2 or more; Y is an organic residue; m and n are positive intgers fulfilling the requirements of $2 \leq m \leq q$ and $n = q - m$ in which q is equal to the metal valency, and 95 to 2% by weight of at least one polymerizable monomer other than said metal ester bond bearing multifunctional monomer, the solid weight ratio of said microparticles to the film-forming polymer being 1:99 to 70:30.

2. A coating composition as set forth in claim 1 wherein said film-forming polymer is an acrylic resin.

3. A coating composition as set forth in claim 1 wherein said film-forming polymer is an acrylic resin having metal ester bond bearing side chains.

4. A coating composition as set forth in claim 1 wherein said film-forming polymer is a polyester resin having metal ester bonds in the molecule thereof.

5. A coating composition as set forth in claim 1 wherein the metal M in the metal ester bond bearing multifunctional polymerizable monomer is selected from the members belonging to Group Ib, IIa, IIb, IIIa, IIIb, IVa, IVb, Va, Vb, VIIb and VIII of the Periodic Table.

6. A coating composition as set forth in claim 5 wherein the metal M is selected from the group consisting of Cu, Zn, Ni, Co, Mn, Sn, Hg and other metals which are toxic, when liberated in sea water, to submarine living organisms.

7. A coating composition as set forth in claim 5 wherein the metal M is selected from the group consisting of Ti, Ge, Ga, Al, Mg, Y, Sr, Zr, Bi, Ba, Ca and Fe.

8. A coating composition as set forth in claim 1 wherein the crosslink density of said metal ester bond bearing crosslinks, expressed in terms of number of moles of organic acid involved in the metal ester bond bearing crosslinks per gram of resin particle, is 0.00003 to 0.01 mol/g.

* * * * *